US010791874B2

(12) United States Patent
De' Longhi

(10) Patent No.: US 10,791,874 B2
(45) Date of Patent: Oct. 6, 2020

(54) CLOSING DEVICE FOR AN APPARATUS FOR COOKING FOOD PRODUCTS

(71) Applicant: DE' LONGHI APPLIANCES S.R.L. CON UNICO SOCIO, Treviso (IT)

(72) Inventor: Giuseppe De' Longhi, Treviso (IT)

(73) Assignee: De' Longhi Appliances S.R.L Con Unico Socio (IT)

( * ) Notice: Subject to any disclaimer, the term of this patent is extended or adjusted under 35 U.S.C. 154(b) by 421 days.

(21) Appl. No.: 15/556,586

(22) PCT Filed: Mar. 9, 2016

(86) PCT No.: PCT/IB2016/051331
§ 371 (c)(1),
(2) Date: Sep. 7, 2017

(87) PCT Pub. No.: WO2016/142876
PCT Pub. Date: Sep. 15, 2016

(65) Prior Publication Data
US 2018/0055286 A1    Mar. 1, 2018

(30) Foreign Application Priority Data
Mar. 9, 2015   (IT) .............................. UD2015A0029

(51) Int. Cl.
*A47J 37/12*    (2006.01)
(52) U.S. Cl.
CPC ................................ *A47J 37/1285* (2013.01)

(58) Field of Classification Search
CPC ................. A47J 37/1285; B29C 45/14; B29C 45/14262; B29C 45/14467; B29C 45/1671
USPC .......................................................... 99/407
See application file for complete search history.

(56) References Cited

U.S. PATENT DOCUMENTS

| 5,525,215 A | 6/1996 | Marchionda |
| 6,085,641 A | 7/2000 | De Longhi |
| 8,257,287 B2 * | 9/2012 | Hanlon ................. A61M 39/10 |
| | | 601/151 |
| 2008/0282905 A1 | 11/2008 | Savage et al. |

FOREIGN PATENT DOCUMENTS

| WO | 2004/034861 A1 | 4/2004 |
| WO | WO2016079083 | * 5/2016 |

* cited by examiner

*Primary Examiner* — Dana Ross
*Assistant Examiner* — Joseph W Iskra
(74) *Attorney, Agent, or Firm* — BakerHostetler

(57) ABSTRACT

A closing device able to be associated with a cooking apparatus of the type where the food product is totally or partly immersed in a cooking liquid, for example a deep fryer, with a main body defining an internal chamber and with a mouth to which a tube to discharge the cooking liquid is coupled. The closing device comprises at least one insert which can be selectively associated with an end open toward the outside of the discharge tube, a closing element which can be selectively associated with the insert, and a gasket interposed between the insert and the closing element.

7 Claims, 2 Drawing Sheets

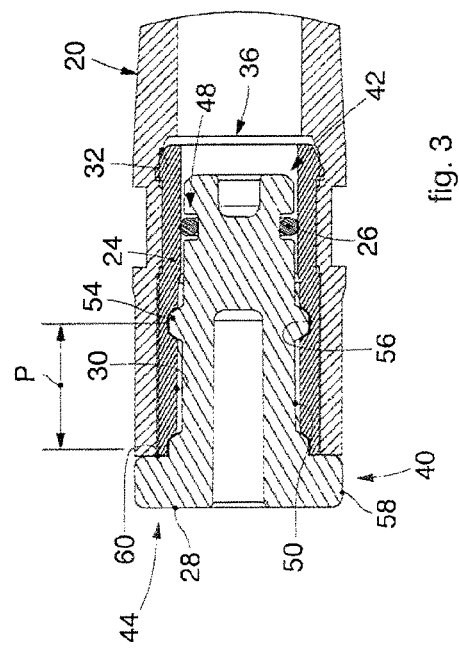
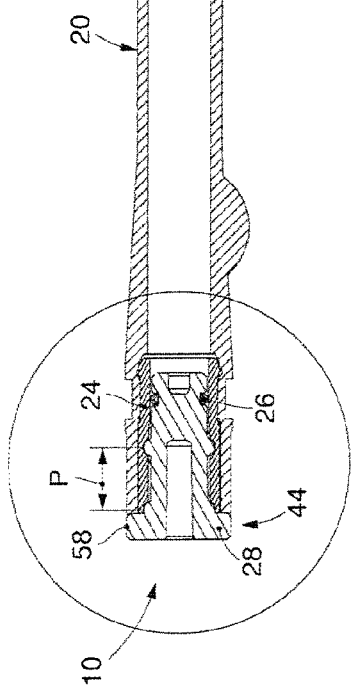
fig. 2
fig. 3

CLOSING DEVICE FOR AN APPARATUS FOR COOKING FOOD PRODUCTS

CROSS-REFERENCE TO RELATED APPLICATIONS

This application is a National Stage of International patent application PCT/IB2016/051331, filed on Mar. 9, 2016, which claims priority to foreign Italian patent application No. UD2015A000029, filed on Mar. 9, 2015, the disclosures of which are incorporated by reference in their entirety.

FIELD OF THE INVENTION

The present invention concerns a closing device for an apparatus for cooking food products.

In particular, the present invention concerns a closing device associable with an apparatus for cooking food products of the type with total or partial immersion of the food product in a cooking liquid, for example a deep fryer for use in the domestic, professional or semi-professional fields.

BACKGROUND OF THE INVENTION

Cooking apparatuses are known, which use a cooking liquid, for example oil fryers, for cooking, in this case frying, food products.

Known deep fryers have a main body substantially defining their bulk, able to contain the cooking oil. Such deep fryers generally also comprise a receptacle inside which the food products to be cooked are inserted. The receptacle is normally inserted in the main body so as to at least partly immerse the food products in the frying oil.

Depending on the type of frying and/or the food product to be fried, it is generally necessary to filter, that is, remove the impurities from the oil, at predetermined periods of time, or to replace it completely, so as to be able to continue frying.

In both cases it is necessary to discharge at least part of the oil from the support body to the outside.

Deep fryers are also known that have a mouth communicating with the main body in order to discharge the oil into external receptacles, or into purification filters, or to collect it in suitable equipment for special waste.

In the state of the art, discharge tubes or pipes are normally used, associated with the mouth.

U.S. Ser. No. 00/608,5641A describes an apparatus for frying food products provided with a discharge tube made of flexible and bendable material. The main body is provided with a seating inside which one end of the discharge tube can be selectively inserted, and which is bent in this condition.

In this solution, the discharge tube has a short working life because, due to the continual bending, it can easily break and therefore it has to be replaced often.

WO2004/034861 describes an apparatus for frying food products provided with a discharge tube made of rigid material, which can rotate to assume at least two different operating positions, for example vertical when the food products are frying and horizontal when the oil is necessarily discharged.

In solutions in the state of the art, it is necessary to stop any possible leakage of oil from the discharge tube, both during frying, and during discharge operations and also during possible movements of or interventions on the cooking apparatus.

To satisfy this requirement, selective closing devices are known, associable with the discharge tube.

Such selective closing devices are generally inserted removably in the discharge tube to clamp it and prevent leakages of oil.

Known closing devices are generally made of silicone. This material disadvantageously entails a poor closing stability and a deterioration when the oil is at high temperatures.

Furthermore, closing devices known in the state of the art are not very efficient because, given the materials they are made of, accidental leakages of the oil are possible, which can create problems to the whole cooking apparatus and/or be dangerous for users.

A purpose of the present invention is to obtain a selective closing device associable with a cooking apparatus, in particular associable with a pipe to discharge the oil, which overcomes at least some of the disadvantages and limitations of the state of the art as described above.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purpose, the invention concerns a closing device able to be associated with a cooking apparatus of the type where the food product is totally or partly immersed in a cooking liquid, for example a deep fryer.

The cooking apparatus has a main body defining an internal chamber and a mouth to which a tube to discharge the cooking liquid is coupled.

According to the present invention, the closing device comprises at least one insert which can be selectively associated with an end open toward the outside of the discharge tube, a closing element which can be selectively associated with the insert, and a gasket interposed between the insert and the closing element.

In one embodiment, the closing element is made of plastic material with a low coefficient of thermal dilation.

In another embodiment of the present invention, the closing element is made of propylene.

Again according to the present invention, an external surface of the closing element has a first threading and an internal surface of the insert has a second threading, wherein the first threading and the second threading are able to be selectively coupled for screwing the closing element with respect to the insert, in order to close the discharge tube.

According to other embodiments, the insert has a hollow portion inside which the gasket is inserted.

According to other embodiments, the closing element has a closing portion that abuts with an abutment surface on the insert or on the discharge tube or on both.

According to other embodiments, the diameter of the closing portion is equal to the diameter of the discharge tube.

According to other embodiments, the first and second threading have a threading pitch wherein the threading pitch is from about 0.3 to 0.5 times the whole length of the closing element.

BRIEF DESCRIPTION OF THE DRAWINGS

These and other characteristics of the present invention will become apparent from the following description of some embodiments, given as a non-restrictive example with reference to the attached drawings wherein:

FIG. 2 is a section view of the cooking apparatus in FIG. 1 according to the present invention;

FIG. 3 is a section view of an enlarged detail of FIG. 2.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
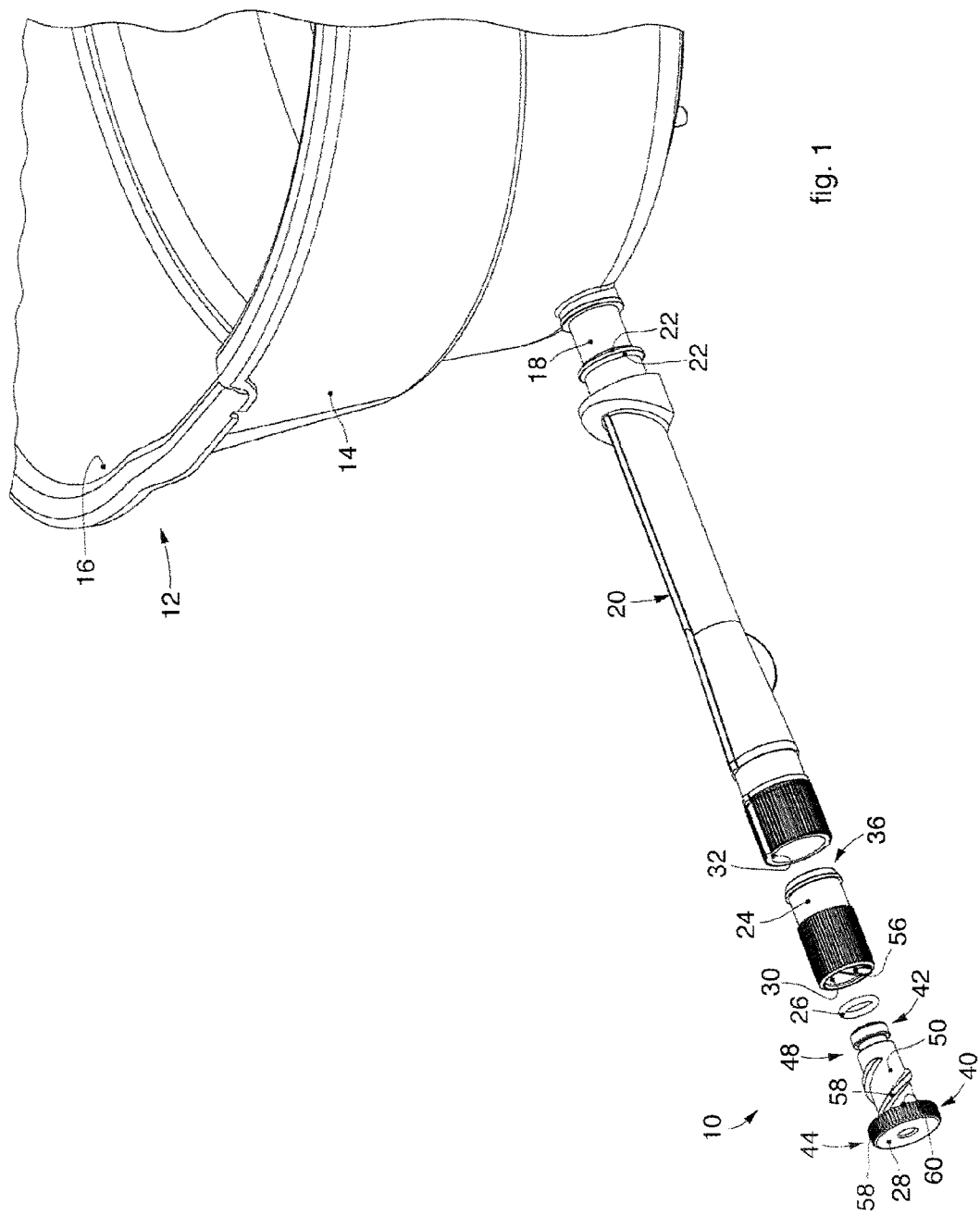
FIG. 1 is a perspective view of a cooking apparatus associated with a closing device according to the present invention.

We shall now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

According to the present invention, FIGS. 1-3 describe a closing device 10 associable with a cooking apparatus 12 for food products, only partly shown.

According to one embodiment, described in the attached drawings, the cooking apparatus 12 can be for example a deep fryer for use in the domestic, semi-professional or professional fields.

It is understood that the cooking apparatus 12 can be any other type of apparatus able to cook food products by heating any type of cooking liquid and/or oil or fat contained inside it, and by means of partial or total immersion of the food product in said liquid.

The cooking apparatus 12 has a main body 14 substantially defining its whole bulk, generally cylindrical in shape or truncated cone shaped, normally converging downward.

The main body 14 defines an internal chamber 16 to contain the oil and possibly the food products to be cooked.

According to a variant embodiment, the cooking apparatus 12 can be selectively associated with a cooking receptacle, not shown here, for example consisting of a metal mesh basket, which possibly rests on an upper edge, to totally or partly immerse the food products in the oil, which receptacle is then removed from the main body 14 at the end of cooking.

In some embodiments of the present invention, the cooking apparatus 12 can be provided with a lid, not shown in the attached drawings, to insulate the food products in the internal chamber 16 during frying.

In the embodiment shown, the main body 14 can have a mouth 18 at the lower part.

The mouth 18 can have a tubular shape with a circular cross section and can allow fluidic communication between the internal chamber 16 and the external environment, in this case to discharge the oil from the main body 14.

According to a variant embodiment, the mouth 18 can be replaced by a simple aperture, for example with a circular shape.

In the embodiment shown, the cooking apparatus 12 is provided with a discharge tube 20, also tubular with a circular cross section, and associated with the mouth 18.

According to one embodiment described in the drawings, the discharge tube 20 has a bigger diameter than that of the mouth 18.

In particular, the mouth 18 and the discharge tube 20 can each have an abutment ring 22 on one of their ends.

When they come into contact, the abutment rings 22 allow a stable coupling of the discharge tube 20 and the mouth 18, and hence also with the main body 14.

According to one embodiment of the present invention, the discharge tube 20 can be made of rigid material and can be selectively coupled with the mouth 18 to discharge the oil.

In other embodiments, the discharge tube 20 can be made of flexible and bendable material and can be unremovably coupled with the mouth 18.

According to the present invention, the cooking apparatus 12 can be associated with a selective closing device 10.

The closing device 10 can be able to clamp the free and open end of the discharge tube 20 to prevent accidental leakages of the oil during frying and/or during discharge operations of the oil and/or during possible movements of or interventions on the cooking apparatus 12.

According to one embodiment of the present invention, the closing device 10 can consist of an insert 24, a gasket 26 and a closing element 28.

According to the present invention, the insert 24 can have a tubular shape with a circular cross section. The insert 24 can couple with the discharge tube 20.

In particular, the free end, open toward the external environment, of the discharge tube 20 has a coupling cavity 32 that develops peripherally and internally.

At one end, the insert 24 has a coupling head 36 with a shape mating with the coupling cavity 32.

According to the present invention, the insert 24 can be inserted inside the discharge tube 20.

In particular, the coupling head 36 can couple with the coupling cavity 32. In this situation, the overall bulk of the insert 24 can be completely contained inside the discharge tube 20.

According to the present invention, the closing element 28 can have a tubular shape with a circular cross section.

The closing element 28 can be inserted into the insert 24 and can stably couple with it.

In particular, the insert 24 is hollow inside to define an internal surface 30.

The closing element 28 has an external surface 50 that can contact the internal surface 30 of the insert 24.

According to one embodiment of the present invention, the closing element 28 has a first end 40 and a second end 42.

Once the closing element 28 is inserted in the insert 24, the first end 40 is located outside the discharge tube 20. In particular, the first end 40 can have a closing portion 44.

According to the present invention, as shown in the attached drawings, the closing portion 44 can have a diameter bigger than that of the closing element 28.

In one embodiment of the present invention, the closing portion 44 can have a diameter equal to that of the discharge tube 20.

Once the closing element 28 is inserted in the insert 24, the closing portion 44 can abut both on the insert 24 and also on the external end of the discharge tube 20.

In particular, the closing element 28 has an abutment surface 60 in the closing portion 44.

The abutment surface 60 can abut on the insert 24 and on the end of the discharge tube 20 to stop the travel of the closing element 28 during its insertion into the insert 24 and hence the discharge tube 20, thus obtaining a stable and effective closure of the discharge tube 20, so as to prevent accidental leakages of the oil.

According to one embodiment of the present invention, near the second end 42, the closing element 28 is provided with a hollow portion 48.

The hollow portion 48 can extend peripherally and can house the gasket 26.

According to the present invention, the gasket 26 can have a circular ring shape, can be made of compressible material and can have a diameter suitable to ensure the closing element 28 is sealed with respect to the insert 24 and consequently with respect to the discharge tube 20.

The insertion of the gasket 26 inside the hollow portion 48 advantageously allows to increase the closing stability and efficiency of the discharge tube 20.

According to the present invention, the closing element 28 can be made of propylene or other plastic materials with a low coefficient of thermal dilation.

Thanks to this, the closing stability and efficiency of the discharge tube 20 is further increased.

According to one embodiment of the present invention, the external surface 50 can have a first threading 54. The first threading 54 can extend from the closing portion 44 to the hollow portion 48.

The internal surface 30 of the insert 24 can have a second threading 56, configured to couple with the first threading 54 to allow the insertion, in this case the screwing, of the closing element 28 inside the insert 24.

According to the present invention, the first threading 54 and the second threading 56 have a threading pitch P that can be from about 0.3 to 0.5 times the whole length of the closing element 28.

According to one embodiment of the present invention, the closing portion 44 can be provided with a friction surface 58.

The friction surface 58 can extend peripherally along the whole closing portion 44 and can facilitate the manual screwing of the closing element 28 with respect to the insert 24 by a user.

In other embodiments, the closing element 28 can be provided with a shaped cavity, which allows the closing element 28 to be screwed with suitable tools.

In another embodiment, the closing element 28 can be provided with both the friction surface 58 and also the shaped cavity described above.

It is clear that modifications and/or additions of parts may be made to the closing device as described heretofore, without departing from the field and scope of the present invention.

It is also clear that, although the present invention has been described with reference to some specific examples, a person of skill in the art shall certainly be able to achieve many other equivalent forms of closing device, having the characteristics as set forth in the claims and hence all coming within the field of protection defined thereby.

The invention claimed is:

1. A closing device configured to be used with a cooking apparatus of the type where the food product is totally or partly immersed in a cooking liquid, the cooking apparatus having a main body defining an internal chamber and further having a mouth to which a tube configured to discharge said cooking liquid is coupled, said closing device comprising:
   at least one insert selectively associated with an end open toward the outside of said discharge tube, the at least one insert defining an internal surface;
   a closing element selectively associated with said insert, the closing element having an external surface configured to selectively contact the internal surface of the insert, the external surface defining a hollow portion thereon; and
   a gasket disposed in the hollow portion of the external surface of the closing element, the gasket being interposed between said internal surface of the insert and said external surface of the closing element,
   wherein the external surface of the closing element has a first threading and the internal surface of the insert has a second threading, said first threading and said second threading being configured to be selectively coupled such that the closing element is screwed with respect to the insert, such that the discharge tube is closed.

2. The closing device as in claim 1, wherein said closing element has a closing portion that abuts with an abutment surface on said insert or on said discharge tube or on both.

3. The closing device as in claim 1, wherein the diameter of the closing portion is equal to the diameter of the discharge tube.

4. The closing device as in claim 1, wherein said first and second threading have a threading pitch (P), and wherein said threading pitch (P) is from about 0.3 to 0.5 times the whole length of the closing element.

5. The closing device as in claim 1, wherein said closing element is made of plastic material with a low thermal dilation coefficient.

6. The closing device as in claim 5, wherein said closing element is made of propylene.

7. The closing device of claim 1, wherein the cooking apparatus is a deep fryer.

* * * * *